Patented June 24, 1941

2,246,950

UNITED STATES PATENT OFFICE 2,246,950

CATALYST REGENERATION

Edward B. Peck, Elizabeth, N. J., assignor to Standard Oil Development Company, a corporation of Delaware No Drawing. Application March 17, 1938, Serial No. 196,425

5 Claims. (Cl. 252—242)

This invention relates to the regeneration of catalysts which have lost their activity because of deposition of coke or tar on the surface, and is more particularly concerned with the regeneration of catalysts used in the conversion of higher boiling hydrocarbons into lower boiling hydrocarbons.

Hydrocarbon oils such as heavy naphthas and gas oils may be converted into lower boiling hydrocarbons suitable for motor fuel and characterized by high octane numbers, by passing the heavier hydrocarbon oil at temperatures of about 750 to 900° F. over a catalyst or contact mass capable of causing splitting or cracking. Purified adsorptive clays such as fuller's earth, acid treated clays or metal oxide gels, etc., are typical of the type of catalyst used. The catalyst is preferably prepared in pill, pellet, tablet or other unit form of relatively small dimensions.

One of the principal difficulties with this process is that the catalyst becomes coated with coke or tarry matter which gradually reduces its catalytic activity to a point at which the conversion is too low for commercial operation. It is then necessary to regenerate the catalyst by removing the deposited coke and tar.

Various methods of regenerating the catalyst may be used. For example, the usual method of regenerating catalysts is to burn off the carbonaceous residue by blowing with air diluted with large volumes of inert gas. The inert gases employed as, for example, carbon dioxide, nitrogen and the like must have adequate heat capacity in order to maintain the temperature during the regeneration process below a critical maximum. This is necessary because the usual catalysts employed in the conversion of higher boiling hydrocarbons to lower boiling hydrocarbons deteriorate rapidly at high temperature due to fusion or change in the catalytic structure. In the usual regeneration operation it is also necessary that a certain minimum temperature be maintained in order to secure adequate ignition and removal of the carbonaceous material. Thus the regeneration operation must be conducted within a specified temperature range and it is necessary to supply inert gases with sufficient heat capacity in order to remove the exothermic heat and maintain the temperature range.

This process of maintaining the temperature in the regeneration zone within a desired range by limiting the oxygen concentration to a sufficiently small percentage, by dilution with inert gases has numerous disadvantages. For example, the ignition temperature of carbonaceous material is a function of the partial pressure of oxygen and consequently by diluting the oxygen the ignition temperature is raised and thus a considerably narrower temperature range is available for carrying out the regeneration of the catalyst. This is a disadvantage since the heat capacity of the system for removing the heat of reaction to prevent a temperature rise above the maximum allowable critical temperature is a function, among other factors, of the number of degrees through which the system may be raised. A further disadvantage of diluting oxygen-containing gas with inert gases in order to maintain the temperature within the desired range is that the combustible reaction may be localized and a very narrow wave front secured when the temperature is high enough for rapid exhaustion of the oxygen. A still further disadvantage is that volatile materials distill from the carbonaceous residue and thus further increase the ignition temperature. This latter effect is directly proportional to the volume of gas used to remove the heat, the time and temperature of regeneration.

It can be readily seen that it is desirable to make the time required for regeneration as short as possible, and to effect complete regeneration without allowing the temperature to exceed a critical maximum.

The present invention is directed to certain improvements in the regeneration step by means of which these desirable objects may be attained. The method will be fully understood from the following description.

The controlling factors in regenerating a catalyst which has become inactive because of coke or tar deposition are (1) coke or tar can be burned off at some minimum ignition temperature $T_1$ which is a function of the coke surface (area and activity), and partial pressure of oxygen, $T_1$ is that temperature at which combustion of the coke will occur at a reasonable rate; (2) there is a maximum temperature $T_2$ beyond which the catalyst may not be heated without loss of activity; and (3) the greater the spread between the ignition temperature $T_1$ and the maximum allowable temperature $T_2$, the greater the capacity of the system for removing the heat of reaction and the more rapid regeneration secured.

According to the present invention, coke and tarry material on the surface of catalysts are removed by blowing inert gas continuously through a catalyst bed and intermittently injecting into this stream for a short period of time oxygen-containing gas which is so regulated to secure burning off of the carbonaceous material within the permissible temperature limits. The process of this invention takes advantage of the high partial pressure of oxygen secured under these conditions to lower the ignition temperature $T_1$, thereby increasing the temperature spread between $T_2$ and $T_1$ and thus increasing the heat capacity of the cooling gases and the entire system. The catalyst is thus regenerated by successive alternate blows of an oxygen-containing gas and inert gas respectively. These alternate blows are continued until the catalyst is regenerated.

The process and manner of conducting the "blows" may be varied widely and will depend upon the type of catalyst being treated and the amount and character of the coke and tarry material to be removed. The inert gas may be any suitable material or gas or mixture of gases as, for example, carbon dioxide or nitrogen. The oxygen-containing gas which is injected intermittently into the stream of inert gas or which may be injected in place of the inert gas, is preferably air although other oxygen-containing gases may be employed. Air may be diluted or enriched to give any oxygen concentration required for regeneration within the temperature limits required to prevent unnecessary deterioration of the catalyst.

The burning step may be carried out for short intervals by blowing only with air without excessive rises in temperature on the catalyst, due probably to the insulating effect of the coke deposit. After the relatively short combustion cycles, the bed is blown with an inert gas, the heat of combustion dispersed and removed, and the combustion phase repeated. The inert gas may be introduced at any desired temperature which obviously may be below the ignition temperature, thereby increasing the temperature spread under which the cooling gases may be raised and thus increasing the heat capacity of the cooling or inert gases. The preferred method of operating is to have the combustion phases relatively short initially as compared to the blowing with the inert gas and then to gradually lengthen the time of the combustion phase until finally the combustion proceeds at a rate that no intermediate cooling is required. In the initial stages of the process it may be desirable to have intense and relatively short burning cycles. By this method of operation some coke and tarry material is burned off at a relatively high temperature but the remaining coke and tarry material itself acts as an insulator and prevents the temperature of the catalyst from exceeding the critical maximum temperature since the time of burning is correspondingly shortened.

The combustion phase of the cycle is carried out with an oxygen concentration which is optimumly adjusted for the particular catalyst to be regenerated. For example, some catalysts may be regenerated with air while others may be so sensitive as to require that the air be diluted with an inert gas. It is desired to have the highest partial pressure of oxygen consistent with maximum temperature control since it permits operating at lower ignition temperatures. Preferred oxygen concentrations used in the combustion phase are in the range of from 1 to 5% to 20% or higher.

The air "blow" and inert gas "blow" may be in the same direction through the catalyst mass, or the two "blows" may be in opposite directions because by so doing the portion of the catalyst traversed by the hottest combustion gases will be traversed by the cooler heat absorbing gases, thus equalizing the temperature throughout.

It is also within the scope of this invention to conduct the catalyst regeneration in an atmosphere having a controlled partial steam pressure. For example, some catalysts such as hydrosilicates of alumina have a decomposition temperature conditioned by a partial pressure of steam. When the partial pressure of steam falls below a certain value the active surface of the catalyst decomposes by loss of water of constitution. The partial pressure of steam required to maintain catalyst stability is related to temperature by the law:

$$\ln p = \frac{Q}{RT} + C$$

where $(p)$ is the partial pressure of steam, $(Q)$ is the heat absorbed per molecule of steam removed from the catalyst, $(T)$ is the absolute temperature and $(R)$ and $(C)$ are constants. This well known law has correlated the findings that the maximum safe temperature of regeneration may be conditioned by partial pressure of steam. Thus a catalyst that regenerates a maximum temperature of 1000° F. at 0.05 atmosphere steam pressure can be safely regenerated at 1200° F. at 0.15 atmosphere steam pressure.

Other catalysts are reactivated by reaction with steam at high temperature and the partial pressure of steam must be held below that at which water will be absorbed by the catalyst. A catalyst that will be stable to steam at 0.15 atmosphere at 1200° F. may absorb moisture with consequent loss of activity at 900° F. unless the partial pressure of steam is held below 0.03 atmosphere. Thus, for some catalysts it may be necessary to dry the inert gas circulated through a catalyst bed to prevent deterioration of the catalyst.

The following example is given for purposes of illustration and is not to be construed as limiting the invention in any manner whatsoever. An activated clay catalyst such as Filtrol, Terrana, Tonsil and fuller's earth, zeolite, bentonite and montmorillonite which are in the form of ⅜" pellets used in the catalytic cracking of petroleum and containing a carbonaceous deposite equivalent to approximately 3% by weight of the catalyst, was treated as follows: An inert gas was blown through the catalyst at the rate of 20,000 volumes of gas per volume of catalyst per hour until the temperature of the catalyst had been reduced to about 700° F. When this temperature was attained, air was injected into the inert stream for one second at 30 second intervals. At the end of five minutes these injections were gradually increased to one second every ten seconds. At the end of ten minutes the injections were increased to an injection time of one second at five second intervals. At the end of 12 minutes the air stream was used without intermittent dilution until the exit gases showed no traces of oxides of carbon. By this procedure the catalyst was reactivated in 20 minutes without the temperature exceeding 1050° F.

The above described catalyst was reactivated with an oxygen-containing gas diluted by the usual procedure and the time of regeneration was 45 minutes and the rate of gas flow was over 30,000 volumes per volume of catalyst per hour.

This invention is not limited by any theories of the mechanism of the reactions nor by any details which have been given merely for purposes of illustration, but is limited only in and by the following claims in which it is intended to claim all novelty inherent in the invention.

I claim:

1. An improved method for the rapid regeneration without injury of a catalyst mass used for the conversion of higher boiling hydrocarbons into lower boiling hydrocarbons which has lost activity through the deposition of coke or tarry matter upon its surface which comprises subjecting the catalyst mass to the effect of oxygen containing gas at about the minimum ignition temperature for the oxygen concentration optimumly adjusted for the particular catalyst to be regenerated, which oxygen containing gas starts ignition of the coke or tarry matter and causes the temperature of the said catalyst mass to rise, subjecting the said catalyst mass when the temperature in said mass has reached a temperature just below that at which the deterioration of the catalyst commences to the effect of cooling inert gases not containing an effectual amount of oxygen until the temperature of said catalyst mass has reached a minimum ignition temperature, then subjecting the catalyst mass to substantially similar succeeding cycles.

2. An improved process for the rapid regeneration without injury of a catalyst mass which has lost activity through the deposition of coke or tarry matter on its surface which comprises subjecting the catalyst mass to alternate "blows" in opposite directions first with a gas containing a sufficient amount between 1% and 21% of oxygen to ignite the coke or tarry matter and cause the temperature of the catalyst mass to rise until said temperature has thereby risen to a point approaching the temperature above which deterioration of the catalyst commences and then with a non-oxidizing gas to cool the mass, the duration of the oxygen containing gas blow being relatively short and gradually increasing as the coke is burned out of the catalyst mass, followed by subjecting the catalyst mass to substantially similar succeeding cycles.

3. An improved process for the rapid regeneration without injury of a catalytic mass which has lost activity through the deposition of coke or tarry matter on its surface which comprises subjecting the catalyst mass to alternate blows of oxygen containing gas to ignite the coke or tarry matter thereby causing the temperature of the catalyst to rise and then before the rise of temperature reaches that at which the catalyst deteriorates, of cooling inert gas, until the coke has been substantially burned out, said gases containing sufficient water vapor to insure optimum partial pressure of water vapor in the regeneration zone, followed by subjecting the catalyst mass to substantially similar succeeding cycles.

4. An improved process for the rapid regeneration without injury of a catalyst mass used for the conversion of higher boiling hydrocarbons into lower boiling hydrocarbons which has lost activity through the deposition of coke or tarry matter on its surface which comprises subjecting the catalyst mass to gas containing oxygen in an amount sufficient to ignite the coke or tarry matter below the temperature at which deterioration of the catalyst commences, thereby causing the temperature of the catalyst mass to rise, allowing said temperature to rise and then subjecting the said mass before said catalyst deterioration temperature is reached to cooling inert gases to lower the temperature to about a minimum at which the ignition of the coke or tarry matter occurs and following with successive, similar treatments until all the coke or tarry matter is removed from the catalyst mass.

5. An improved method for the rapid regeneration without injury of a catalyst which has lost activity through the deposition of coke or tarry matter on its surface which comprises subjecting the catalyst at ignition temperatures to a continuous stream of gas which alternately contains sufficient oxygen to burn off said coke or tarry matter and to cause the temperature of the catalyst to rise and alternately contains insufficient oxygen for this purpose and serves to cool the catalyst, said gas stream which contains insufficient oxygen being introduced before the catalyst deterioration temperature is reached, the concentration of oxygen in said stream of gas containing sufficient oxygen being progressively increased from relatively low to relatively high, the temperature of the catalyst being maintained within the limits of minimum ignition temperature and a maximum temperature below that at which deterioration of the catalyst commences, and subjecting the catalyst to substantially similar succeeding cycles.

EDWARD B. PECK.